Dec. 20, 1960 J. J. MORSCH 2,965,252
BOAT TRAILER
Filed June 29, 1959

INVENTOR.
JESSE J. MORSCH
BY
ATTORNEY

United States Patent Office 2,965,252
Patented Dec. 20, 1960

2,965,252
BOAT TRAILER
Jesse J. Morsch, 408 N. 4th St., Douglas, Wyo.
Filed June 29, 1959, Ser. No. 823,755
6 Claims. (Cl. 214—84)

This invention relates to a boat trailer for transporting a boat at the rear of an automotive vehicle.

The principal object of the invention is to provide an exceedingly light weight, sturdy trailer mechanism which can be quickly and easily attached to an automotive vehicle for the transportation of a boat and to provide means upon the trailer which will automatically bring the boat to a central aligned position on the trailer as it is drawn thereon without it being necessary to align the trailer with the boat.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
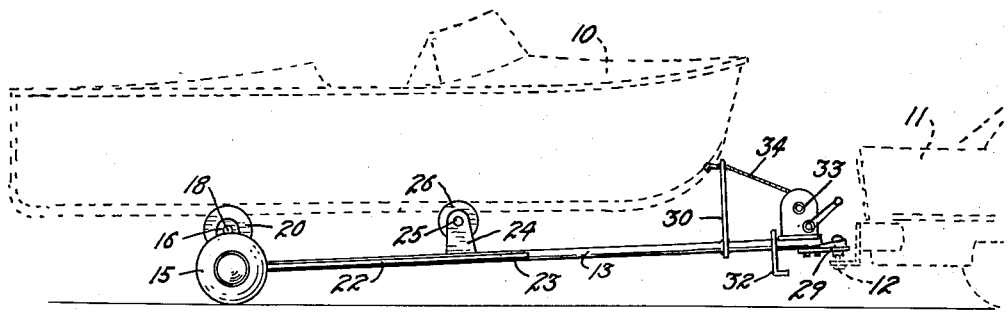
Fig. 1 is a side view of the improved boat trailer showing in broken line, a boat 10 in place thereon and a conventional towing vehicle 11 attached thereto.
Figure 2:
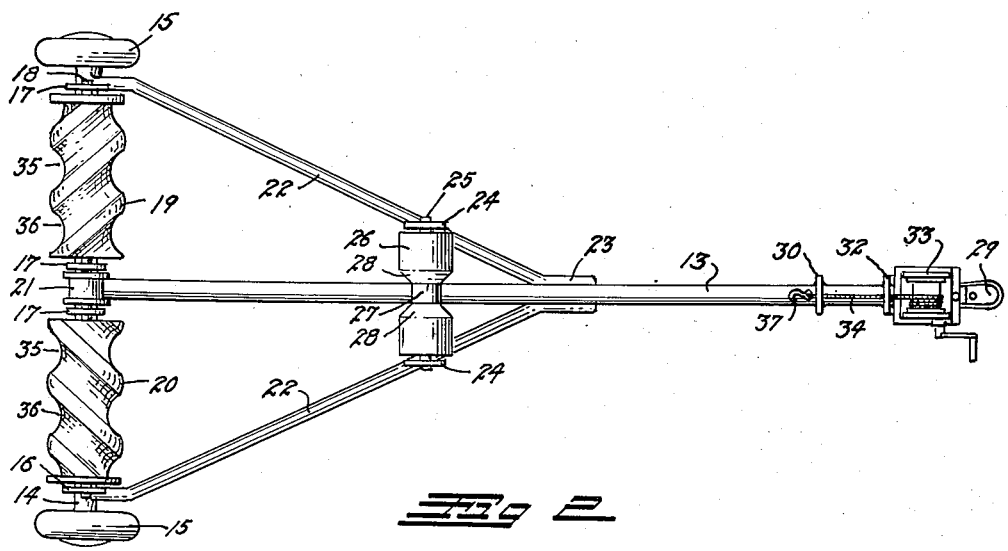
Fig. 2 is an enlarged plan view of the invention.
Figure 3:
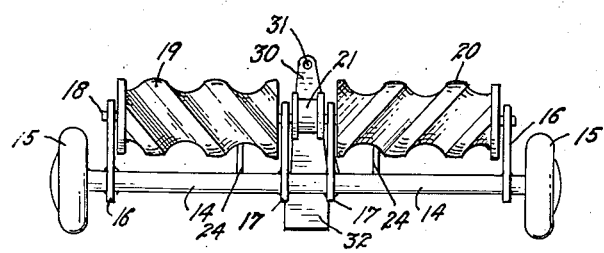
Fig. 3 is a similarly enlarged rear view thereof.

The improved boat trailer comprises a T-shaped tubular frame consisting of a medial, longitudinally-extending, tubular tongue member 13 joined, in T-shaped arrangement, to a tubular axle member 14. Conventional, pneumatically-tired wheels 15 are rotatably mounted on the extremities of the axle member 14 in any suitable manner. The towing vehicle 11 is provided with a conventional tow-ball attachment 12. The forward extremity of the tongue member 13 may be provided with any conventional tow hitch 29 for engagement with the tow-ball attachment 12 of the towing vehicle 11. The tongue member 13 and the axle member 14 are rigidly maintained in rectangular relation by means of tubular diagonal braces 22 which are welded at their rear extremities adjacent the outer extremities of the axle member 14 and at their forward extremities to opposite sides of the tongue member 13, as indicated at 23.

A cable guide post 30 is welded to and about the tongue member 13 adjacent the forward extremity of the latter and extends upwardly therefrom. The cable guide post 30 is provided with a cable guide opening 31 adjacent its upper extremity. A front leg member 32 also surrounds and is welded to the tongue member 13 adjacent the forward extremity of the latter and extends downwardly therefrom to form a supporting leg for the forward extremity of the tongue member 13 when the latter is not connected with a towing vehicle. An outer shaft-supporting plate 16 is welded to, and extends upwardly from, the axle member 14 adjacent each extremity of the latter and two similar inner shaft-supporting plates 17 are welded to, and extend upwardly from, the axle member 14, in spaced relation, adjacent the middle thereof.

A roller shaft 18 extends through all of the shaft-supporting plates 16 and 17 above and in parallel relation to the axle member 14. A grooved roller 19 is rotatably mounted on the shaft 18 between the outer plate 16 and the inner plate 17 at the left side of the trailer and a similar grooved roller 20 is rotatably mounted on the shaft 18 between the other outer plate 16 and the other inner plate 17.

The grooved rollers 19 and 20 may be formed from any suitable material. For instance, each could be turned from a relatively large cylindrical wooden block of large diameter to provide two wide, deep, spiral grooves 35 and 36 of relatively steep pitch and in side-by-side relation. The grooves in the roller 20 are pitched oppositely to the grooves in the roller 19, the grooves in the roller 19 being "right handed" and the grooves in the roller 20 "left handed".

A grooved rear keel roller 21 is rotatably mounted on the shaft 18 between the two inner shaft-supporting plates 17 and a forward keel roller 26 is rotatably mounted forwardly of, and in alignment with, the roller 21. The forward keel roller 26 is supported upon a pair of forward roller supports 24 which are welded or otherwise secured to each of the diagonal braces 22 and extend upwardly therefrom. A forward roller shaft 25 extends through the roller supports 24 to rotatably support the forward keel roller 26. The forward keel roller 26 is provided with a medial indented keel groove 27 of reduced diameter having inclined sides 28. Any conventional cable winding winch 33 may be mounted upon the forward extremity of the tongue member 13 in any desired manner for the purpose of reeling in a tow cable 34. The tow cable 34 extends rearwardly from the winch 33 through the cable guide opening 31 in the cable guide post 30 and terminates in any suitable attachment devices 37 for attachment to the prow of the boat 10.

In use, the trailer is backed up to the shore line and into the water if possible. The cable 34 is attached to the boat 10 and the winch 33 is actuated to draw the keel toward the rollers 19 and 20. It is not necessary to align the boat with the trailer since it is immaterial where the keel encounters the rollers or which roller it contacts. It is also immaterial whether the keel is at right angles to the axis of the rollers.

The forward movement of the boat will rotate the roller, upon which it rests, forwardly so that the grooves will carry the keel inwardly until it drops upon the rear keel roller 21. It will then travel forwardly into the groove 27 in the forward keel roller 26 to a position against the cable guide post 30 as shown in Fig. 1. The forward keel roller 26 is relatively long or wide so that the bottom of the boat will best on the two extremities thereof to support the boat against sideward tilting.

While a specific form of the improvement has been described and illustrated herein, it is to be understood that the same may be varied within the scope of the appended claims, without departing from the spirit of the invention

Having thus described the invention what is claimed and desired secured by Letters Patent is:

1. A boat trailer comprising: a trailer frame; wheels supporting the rear of said frame; a towing attachment device at the forward extremity of said frame; a rear keel roller medially supported at the rear of said frame; a forward keel roller medially supported from said frame forwardly of said rear keel roller; a fully rotatable spirally-grooved roller supported from said frame at each side of said rear keel roller and arranged to be rotated by frictional engagement with the keel of a forwardly moving boat resting in a groove thereof to carry said keel inwardly to said rear keel roller; and means for drawing said boat forwardly over said rollers.

2. A boat trailer as described in claim 1 in which the grooves in each of the spirally grooved rollers are of opposite hand to the grooves in the other spirally-grooved roller, said grooves being pitched so as to carry the boat keel inwardly along either roller toward said rear keel roller as the boat is drawn forwardly thereon.

3. A boat trailer as described in claim 2 in which each of the two grooved rollers is provided with two similar grooves of like pitch positioned in spiral side-by-side relation.

4. A boat trailer comprising: an elongated tongue member; an axle member secured to and extending horizontally across the rear extremity of said tongue member in T-shaped relation thereto; ground engaging wheels rotatably mounted at the extremities of said axle member; a shaft supporting member mounted on and arising from said axle member adjacent each wheel; a roller shaft extending between and supported by said supporting members above and in parallel relation to said axle member; keel receiving means at the middle of said shaft; and a freely rotatable, spirally grooved roller positioned on said shaft at each side of said keel receiving means, the spiral grooves in each roller being of opposite hand to the grooves in the other roller so that either roller will carry a boat keel resting thereon toward said keel receiving means when said grooved roller is rotated forwardly by frictional engagement with a forwardly moving keel.

5. A boat trailer as described in claim 4 having a pair of spaced-apart shaft supporting members mounted on said axle member at each side of said keel-receiving means, one of said spirally grooved rollers being mounted for free rotation between the members of each pair of members and in which the keel-receiving means comprises a peripherally grooved rear keel roller.

6. In a boat trailer having medially positioned keel supporting means for supporting the keel of a boat thereon, means for transporting said keel transversally inward to said keel supporting means comprising a freely rotatable spirally grooved roller at each side of said keel supporting means, the grooves in said rollers being oppositely pitched, the pitches being such that when a keel positioned on either roller is drawn forward the frictional contact between the keel and the roller will rotate the latter to carry said keel transversally inward under the influence of the spiral of the grooves in the supporting roller.

References Cited in the file of this patent

UNITED STATES PATENTS

| | | |
|---|---|---|
| 1,750,310 | Jonkel et al. | Mar. 11, 1930 |
| 2,558,418 | Brueckman | June 26, 1951 |
| 2,571,213 | Cunningham et al. | Oct. 16, 1951 |
| 2,805,786 | Green | Sept. 10, 1957 |
| 2,882,064 | Morrison | Apr. 14, 1959 |